US007309280B2

(12) United States Patent
Toyoda

(10) Patent No.: US 7,309,280 B2
(45) Date of Patent: Dec. 18, 2007

(54) GAMING MACHINE, SERVER, AND PROGRAM WITH IMAGE OF REAL PLAYER

(75) Inventor: Hirobumi Toyoda, Tokyo (JP)

(73) Assignee: ARUZE Co., Ltd. (JP)

( * ) Notice: Subject to any disclaimer, the term of this patent is extended or adjusted under 35 U.S.C. 154(b) by 758 days.

(21) Appl. No.: 10/619,183

(22) Filed: Jul. 15, 2003

(65) Prior Publication Data

US 2004/0087355 A1 May 6, 2004

(30) Foreign Application Priority Data

Jul. 16, 2002 (JP) ............................ 2002-207475

(51) Int. Cl.
*G06F 17/00* (2006.01)
*G06F 19/00* (2006.01)

(52) U.S. Cl. ........................... 463/16; 463/17; 463/18; 463/19; 463/20; 463/22; 463/25; 463/30; 463/31; 463/32; 463/7; 463/9; 463/10

(58) Field of Classification Search .................... None
See application file for complete search history.

(56) References Cited

U.S. PATENT DOCUMENTS 5,221,083 A 6/1993 Dote
5,616,078 A * 4/1997 Oh ............................... 463/8
5,688,174 A * 11/1997 Kennedy ..................... 463/37
5,762,552 A 6/1998 Vuong et al.
6,273,820 B1 8/2001 Haste, III
6,607,443 B1 * 8/2003 Miyamoto et al. ............ 463/40
2003/0119574 A1 * 6/2003 Yang ........................... 463/16

FOREIGN PATENT DOCUMENTS

| | | |
|---|---|---|
| EP | 1195730 | 4/2002 |
| JP | 06-165879 | 6/1994 |
| JP | 10-80509 | 3/1998 |
| JP | 10-127904 | 5/1998 |
| JP | 10-201956 | 8/1998 |
| JP | 10-314367 | 12/1998 |
| JP | 10-327353 | 12/1998 |
| JP | 10-337352 | 12/1998 |
| JP | 11-033230 | 2/1999 |
| JP | 11-164196 | 6/1999 |
| JP | 11-181685 | 7/1999 |
| JP | 11-300034 | 11/1999 |
| JP | 2000-90351 | 3/2000 |
| JP | 2000-233075 | 8/2000 |
| JP | 2000-233080 | 8/2000 |
| JP | 2001-070642 | 3/2001 |
| JP | 2001-232061 | 8/2001 |
| JP | 2001-285827 | 10/2001 |
| JP | 2002-928 | 1/2002 |

* cited by examiner

*Primary Examiner*—Robert Pezzuto
*Assistant Examiner*—Milap Shah
(74) *Attorney, Agent, or Firm*—Antonelli, Terry, Stout & Kraus, LLP

(57) ABSTRACT

A gaming machine, with which a plurality of players play a game against each other, is provided so as to enable the players to perform realistic tactical interactions with each other. In a player-versus-player type gaming machine, a plurality of players including a virtual player prepared in advance play the game. Each virtual player is provided with individual personality data and/or response data and images of players are arranged to be displayed in accordance with these data. A change in expression of a real player may be captured by an image taking device.

11 Claims, 11 Drawing Sheets

Fig. 5

| Virtual player | Basic personality | Degree as a gambler | Acting ability | Learning ability | Emotional stability | Circumstance ascertaining ability |
|---|---|---|---|---|---|---|
| A | Aggressive | 5 | 4 | 3 | 2 | 3 |
| B | Sly | 4 | 5 | 4 | 4 | 4 |
| C | Honest | 4 | 1 | 4 | 1 | 3 |
| D | Wise | 3 | 3 | 5 | 4 | 5 |

Fig. 8 A

| Player | Order of entry | Number of times of betting (times) | Betted quantity (medals) | Average betting time (s) | Number of wins |
|---|---|---|---|---|---|
| E | 4 | 3 | 14 | 3 | 3 |
| F | 1 | 1 | 4 | 10 | 1 |
| G | 3 | 3 | 14 | 8 | 7 |
| H | 2 | 2 | 8 | 6 | 4 |

Fig. 8 B

| Player | Carefulness | Degree of gambler | Decisiveness | Gaming strength | Continuation |
|---|---|---|---|---|---|
| E | 2 | 5 | 5 | 3 | 1 |
| F | 5 | 2 | 2 | 2 | 0 |
| G | 3 | 4 | 3 | 5 | 1 |
| H | 4 | 3 | 4 | 4 | 0 |

GAMING MACHINE, SERVER, AND PROGRAM WITH IMAGE OF REAL PLAYER

CROSS-REFERENCE TO RELATED APPLICATIONS

This application is based upon and claims the benefit of priority from the prior Japanese Patent Application No. 2002-207475 filed on Jul. 16, 2002, the entire contents of which are incorporated herein by reference.

This application is related to co-pending U.S. patent application Ser. No. 10/619,185, entitled "Gaming Machine, Server, and Program With a Virtual Player", filed on Jul. 15, 2003.

BACKGROUND OF THE INVENTION

1. Field of the Invention

This invention relates to a gaming machine, a server, and a program.

2. Related Art

Since priorly, gaming machines, with which a plurality of players face each other and play a game, have been installed in game halls. Generally, such a gaming machine is for playing a game in which a plurality of players carry out tactical interactions with each other, for example, a poker game, mahjong, or other card game. Among such games, with a poker game, arrangements are made to simulate closely the sensation of actually gambling in a casino and this type of game is popular in game halls.

As can be understood from the term, "poker face," poker is game in which the "face" of a player has a large influence on the game result. With any player, subtle changes in expression occur when a change in the state of the game occurs, such as when cards are dealt, betting is performed, etc. It is not an overstatement to say that the chances of winning in poker change by whether or not such changes in expression can be controlled. That is, a poker game can be said to be a game with which differences in an individual's skill readily become apparent and tactical interactions decide the game.

Poker games can be largely classified into two types. One type is the player-versus-dealer type, with which a game is played against a dealer who deals cards, and the other type is the player-versus-player type, with which the difficulty of forming winning combinations is competed among players.

A player-versus-player type poker game has one significant characteristic. That is, the strategy to be employed to win cannot be decided unless the strategy of an opponent is known to some degree.

However, with a gaming machine installed in a game hall, since an unspecific number of players can participate interchangingly, it is impossible to set up such a strategy. That is, the reactions of other players must be observed on each occasion while playing the game and counteracted flexibly.

Specifically, in a player-versus-player type poker game, strategies must be set up coolly and flexibly under circumstances where there are, on one hand, players who play aggressively with a calm expression even if he/she has only a weak winning combination, such as a one pair, and on the other hand, players who look insecure even though having a straight flush on hand, and tactical interactions are carried out while considering the habits of an unspecific number of such other players.

Also, with a poker game, such as "7-Card-Stud," which is mainstream in casinos in Las Vegas, etc., the timing of betting takes on an extremely high significance. Such a game is completely of a level of a "psychological battle" and the win or loss of each player depends on his/her observation abilities.

However, in playing a player-versus-player type poker game with a gaming machine installed in a game hall, there is one problem. This is the problem of insufficient number of players. That is, in a case where a player-versus-player type poker game is to be played in a game hall, the game cannot be started unless a certain number of players participate.

In order to resolve such a problem, a method of playing a game by displaying a virtual dealer on a screen as in prior-art poker gaming machines (for example, the method described in Japanese Unexamined Patent Publication No. Hei 11-300034) may be applied to make virtual players appear in a game.

However, whereas only one dealer is necessary for playing a poker game, with a player-versus-player type poker game, a plurality of virtual players must be prepared in order to make up for the insufficient number of players. Moreover, as mentioned above, since a player-versus-player type poker game is especially strong in the aspect of "psychological battle," the changes of expression can change the result of a game. Thus if the plurality of virtual players that are prepared are arranged to be controlled in a uniform manner, a real player can learn the pattern of control (to be specific, the changes in expression, etc.), become able to win readily by coming up with corresponding strategies, and thus become bored readily.

Such a problem is not only a problem for poker games but also for other gaming machines with which a plurality of players play against each other.

SUMMARY OF THE INVENTION

This invention has been made in view of problems such as the above, and an object thereof is to provide a gaming machine, of a type with which a plurality of players play a game against each other, that enables players to perform realistic tactical interactions with each other.

This invention provides in a player-versus-player type gaming machine, with which a plurality of players play a game against each other, a gaming machine, with which a plurality of virtual players are prepared in advance, each virtual player is provided with individual personality data and response data, images are arranged to be displayed in accordance with these data, and the changes in expressions of real players are captured using image taking devices.

More specifically, according to the present invention, the following may be provided.

(1) In a gaming machine comprising: a display part, displaying the states of a game; and a game control means, controlling the states of a game in accordance with input information from players; and with which a plurality of players, including at least one virtual player who is not a real player, play a game against each other, a gaming machine is provided that further comprises: image taking means, installed in the above-mentioned gaming machine and capturing images of the above-mentioned real players; an image data storage means, storing a plurality of image data that are displayed on the above-mentioned display part as images of the above-mentioned virtual players; a response image data storage means, storing response image data, which are provided individually according to each virtual player and displayed as images on the above-mentioned display part in accordance with the circumstances of a game played on the above-mentioned gaming machine; a detection means, detecting an insufficiency in the number of players playing a game with the above-mentioned gaming machine; and a virtual player selection means, selecting the above-mentioned virtual players in accordance with the detection result of the above-mentioned detection means; and is characterized in the above-mentioned game control means making the virtual players, which have been selected by the above-mentioned virtual player selection means in accordance with the detection result of the above-mentioned detection means, participate in the game played on the above-mentioned gaming machine and making images of the above-mentioned real players, captured by the above-mentioned image taking means, and/or the above-mentioned response image data, stored in the above-mentioned response image data storage means, be displayed on the above-mentioned display part at predetermined timings in accordance with the circumstances of the game played on the above-mentioned gaming machine.

With this invention, "a gaming machine comprising: a display part, displaying the states of a game; and a game control means, controlling the states of a game in accordance with input information from players; and with which a plurality of players, including at least one virtual player who is not a real player, play a game against each other," is equipped with "image taking means, installed in the above-mentioned gaming machine and capturing images of the above-mentioned real players; an image data storage means, storing a plurality of image data that are displayed on the above-mentioned display part as images of the above-mentioned virtual players; a response image data storage means, storing response image data, which are provided individually according to each virtual player and displayed as images on the above-mentioned display part in accordance with the circumstances of a game played on the above-mentioned gaming machine; a detection means, detecting an insufficiency in the number of players playing a game with the above-mentioned gaming machine; and a virtual player selection means, selecting the above-mentioned virtual players in accordance with the detection result of the above-mentioned detection means;" to enable "the above-mentioned game control means making the virtual players, which have been selected by the above-mentioned virtual player selection means in accordance with the detection result of the above-mentioned detection means, participate in the game played on the above-mentioned gaming machine and making images of the above-mentioned real players, captured at predetermined timings by the above-mentioned image taking means, and/or the above-mentioned response image data, stored in the above-mentioned response image data storage means, be displayed as images on the above-mentioned display part in accordance with the circumstances of the game played on the above-mentioned gaming machine."

Here, the display part may include a monitor or other display device or may be a display means. The image taking means may include, for example, a camera or other image taking means. The image data storage means may include, for example, a RAM, ROM or other storage means and may include a hard disk, magnetic disk, optical disk, or other storage medium. The response image data storage means may include, for example, a RAM, ROM or other storage means and may include a hard disk, magnetic disk, optical disk, or other storage medium. The detection means may include a means for detecting the existence of players. For example, in a case where a player loads medals or other game media to participate in a game by the above-described gaming machine, the detection means may include a sensor that detects the loading of these medals. The detection means may also include a device that detects that a loading signal for medals, etc., is not received from the above-mentioned sensor. The detection means may furthermore include a comparison device, which compares the number of players that is determined priorly for a game with the number of players for which the performing of an initial action has been detected by actual loading of medals, etc., to judge that the number of actual players has not reached the priorly determined number of players. Also, the virtual player selection means may include, for example, a lottery means that can perform selection from a plurality of virtual player candidates by lottery. Specifically, the virtual player selection means may include a random number generating device and/or random number generating part that generates random numbers.

Specifically, when with a gaming machine with which a plurality of players play a game against each other, the number of players is insufficient, virtual players, which are also called computer players, are set up and made to play against real players. A plurality of types of these virtual players are prepared in the gaming machine and each has different response data to provide abundant variations in responses during a game. For example, virtual players may be made to have response image data corresponding to different expressions for predetermined situations or game states during a game or for changes of game states. More specifically, a plurality of types may be prepared including, for example, a virtual player having response image data corresponding to expressing a full smile when cards that form three of a kind are dealt or a virtual player having image data corresponding to a so-called poker face expression, etc. With this invention's gaming machine, the reactions and expressions of real players during a game are captured by the image taking means installed in the gaming machine and displayed on the display part and the response data of virtual players can be used to display the reactions and expressions of virtual players during a game on the display part. Other players, whose reactions and expressions are not displayed on the display part can thereby observe such players in order to play the game to their own advantage. Meanwhile, players, whose reactions and expressions are displayed on the display part can put on an act in order to trick other players and thereby play the game to their own advantage in return.

By arranging a gaming machine as described above, it can be anticipated that players will be able to have the impression of actually playing in a casino, etc.

(2) The gaming machine as set forth in (1) is provided that is characterized in that the above-mentioned predetermined timings are timings at which a change is about to occur, a change is occurring, or a change has occurred in the game state of a certain player, among the plurality of players playing a game with the above-mentioned gaming machine.

With this invention, the timings at which "images of the above-mentioned real players, captured by the above-mentioned image taking means, and/or the above-mentioned response image data, stored in the above-mentioned response image data storage means, 1" are made to be "displayed on the above-mentioned display part" can be arranged to be "timings at which a change is about to occur, a change is occurring, or a change has occurred in the game state of a certain player, among the plurality of players playing a game with the above-mentioned gaming machine."

Thus with this invention's gaming machine, the expressions, etc., of a player can be observed when a change is about to occur, while a change is occurring, or after a change has occurred in the game state of the player, that is, at timings at which the expressions and reactions of the player change most readily. On the other hand, a player who knows that his/her reactions and expressions will be displayed on the display part can put on an act at such timings to trick other players and thereby play the game to his/her own advantage in return.

By arranging a gaming machine as described above, it can be anticipated that players will be able to have the impression of actually playing in a casino, etc.

(3) In a server, which controls, via a communication line, gaming machines, each comprising: a display part, displaying the states of a game; a game control means, controlling the states of a game in accordance with input information from players; and image taking means, capturing images of the players; and with which a plurality of players, including at least one virtual player who is not a real player, play a game against each other, a server is provided that further comprises: an image data storage means, storing a plurality of image data that are displayed on the above-mentioned display part as images of the above-mentioned virtual players; a response image data storage means, storing response image data, which are provided individually according to each virtual player and displayed as images on the above-mentioned display part in accordance with the circumstances of a game played on the above-mentioned gaming machines; a detection means, detecting an insufficiency in the number of players playing a game with the above-mentioned gaming machines; and a virtual player selection means, selecting the above-mentioned virtual players in accordance with the detection result of the above-mentioned detection means; and is characterized in the above-mentioned game control means making the virtual players, which have been selected by the above-mentioned virtual player selection means in accordance with the detection result of the above-mentioned detection means, participate in the game played on the above-mentioned gaming machines and making images of the above-mentioned real players, captured by the above-mentioned image taking means, and/or the above-mentioned response image data, stored in the above-mentioned response image data storage means, be displayed on the above-mentioned display part at predetermined timings in accordance with the circumstances of the game played on the above-mentioned gaming machines.

With this invention, "a server, which controls, via a communication line, gaming machines, each comprising; a display part, displaying the states of a game; a game control means, controlling the states of a game in accordance with input information from players; and image taking means, capturing images of the players; and with which a plurality of players, including at least one virtual player who is not a real player, play a game against each other," is equipped with "an image data storage means, storing a plurality of image data that are displayed on the above-mentioned display part as images of the above-mentioned virtual players; a response image data storage means, storing response image data, which are provided individually according to each virtual player and displayed as images on the above-mentioned display part in accordance with the circumstances of a game played on the above-mentioned gaming machines; a detection means, detecting an insufficiency in the number of players playing a game with the above-mentioned gaming machines; and a virtual player selection means, selecting the above-mentioned virtual players in accordance with the detection result of the above-mentioned detection means;" to enable "the above-mentioned game control means making the virtual players, which have been selected by the above-mentioned virtual player selection means in accordance with the detection result of the above-mentioned detection means, participate in the game played on the above-mentioned gaming machines and making images of the above-mentioned real players, captured at predetermined timings by the above-mentioned image taking means, and/or the above-mentioned response image data, stored in the above-mentioned response image data storage means, be displayed as images on the above-mentioned display part in accordance with the circumstances of the game played on the above-mentioned gaming machines."

By arranging a server in such a manner, when with gaming machines with which a plurality of players play a game against each other, the number of players is insufficient, virtual players, which are also called computer players, can be set up and made to play against real players. A plurality of types of these virtual players are prepared in the server and each has different response data to provide abundant variations in responses during a game. By using this invention's server, the reactions and expressions of real players during a game can be captured by the image taking means installed in the gaming machine and be displayed on the display part and the response data of virtual players can be used to display the reactions and expressions of virtual players during a game on the display part. Other players, whose reactions and expressions are not displayed on the display part can thereby observe such players in order to play the game to their own advantage. Meanwhile, players, whose reactions and expressions are displayed on the display part can put on an act in order to trick other players and thereby play the game to their own advantage in return.

Also by using a server as described above, it can be anticipated that players who play games with the respective gaming machines will be able to have the impression of actually playing in a casino, etc.

(4) In a program for a gaming machine comprising: a display part, displaying the states of a game; a game control means, controlling the states of a game in accordance with input information from players; and image taking means, installed in the above-mentioned gaming machine and capturing images of real players; and with which a plurality of players, including at least one virtual player who is not an above-mentioned real player, play a game against each other, and furthermore comprising: an image data storage means, storing a plurality of image data that are displayed on the above-mentioned display part as images of the above-mentioned virtual players; and a response image data storage means, storing response image data, which are provided individually according to each virtual player and displayed as images on the above-mentioned display part in accordance with the circumstances of a game played on the above-mentioned gaming machine; a program is provided that makes the above-mentioned gaming machine execute: a detection step of detecting an insufficiency in the number of players playing a game with the above-mentioned gaming machine; a virtual player selection step of selecting the above-mentioned virtual players in accordance with the detection result obtained in the above-mentioned detection step; a step in which the above-mentioned game control means makes the virtual players, which have been selected in the above-mentioned virtual player selection step in accordance with the detection result obtained in the above-mentioned detection step, participate in the game played on the above-mentioned gaming machine; and an image display step of making images of the above-mentioned real players, captured by the above-mentioned image taking means, and/ or the above-mentioned response image data, stored in the above-mentioned response image data storage means, be displayed on the above-mentioned display part at predetermined timings in accordance with the circumstances of the game played on the above-mentioned gaming machine.

With this invention's program, "a gaming machine comprising: a display part, displaying the states of a game; a game control means, controlling the states of a game in accordance with input information from players; and image taking means, installed in the above-mentioned gaming machine and capturing images of real players; and with which a plurality of players, including at least one virtual player who is not an above-mentioned real player, play a game against each other, and furthermore comprising: an image data storage means, storing a plurality of image data that are displayed on the above-mentioned display part as images of the above-mentioned virtual players; and a response image data storage means, storing response image data, which are provided individually according to each virtual player and displayed as images on the above-mentioned display part in accordance with the circumstances of a game played on the above-mentioned gaming machine;" can be made to "execute: a detection step of detecting an insufficiency in the number of players playing a game with the above-mentioned gaming machine; a virtual player selection step of selecting the above-mentioned virtual players in accordance with the detection result obtained in the above-mentioned detection step; a step in which the above-mentioned game control means makes the virtual players, which have been selected in the above-mentioned virtual player selection step in accordance with the detection result obtained in the above-mentioned detection step, participate in the game played on the above-mentioned gaming machine; and an image display step of making images of the above-mentioned real players, captured by the above-mentioned image taking means, and/or the above-mentioned response image data, stored in the above-mentioned response image data storage means, be displayed on the above-mentioned display part at predetermined timings in accordance with the circumstances of the game played on the above-mentioned gaming machine."

By using this program in a gaming machine, when with the gaming machine, the number of players is insufficient, virtual players, which are also called computer players, can be set up and made to play against real players. A plurality of types of these virtual players are prepared in the gaming machine and each has different response data to provide abundant variations in responses during a game. With this invention's gaming machine, the reactions and expressions of real players during a game can be captured by the image taking means installed in the gaming machine and be displayed on the display part and the response data of virtual players can be used to display the reactions and expressions of virtual players during a game on the display part. Other players, whose reactions and expressions are not displayed on the display part can thereby observe such players in order to play the game to their own advantage. Meanwhile, players, whose reactions and expressions are displayed on the display part can put on an act in order to trick other players and thereby play the game to their own advantage in return.

By arranging a gaming machine as described above, it can be anticipated that players will be able to have the impression of actually playing in a casino, etc.

[Definition of Terms, etc.]

With this description, a display part may refer to a display means and is installed in a gaming machine for display of the states of a game played on the gaming machine and, in regard to number, a plurality of such display parts may be installed.

A virtual player is a concept of a player as opposed to a real player or an actual player. The virtual player may be generated by a computer incorporated in a gaming machine.

Furthermore, "message information" refers to information that is sent and received by a player to and from other players to promote some degree of mutual understanding and, for example, refers to character information, audio information, images, etc.

Further features of the invention, its nature, and various advantages will be more apparent from the accompanying drawings and the following detailed description of the invention.

BRIEF DESCRIPTION OF THE DRAWINGS

FIG. 5 shows data with virtual players to participate in the game on the poker gaming machine according to the embodiment of the present invention.

FIG. 8A shows game condition data of a player participating in a game on the poker gaming machine according to the embodiment of the present invention.

FIG. 8B shows game condition data of a player participating in the game on the poker gaming machine according to the embodiment of the present invention.

DETAILED DESCRIPTION OF THE INVENTION

A preferred embodiment of this invention shall now be described based on the drawings. With the following embodiment, a poker gaming machine shall be used and described as a preferred embodiment of this invention's gaming machine.

[Arrangement of a Poker Gaming Machine]

The arrangement of a poker gaming machine by this invention shall now be described.

Figure 1:
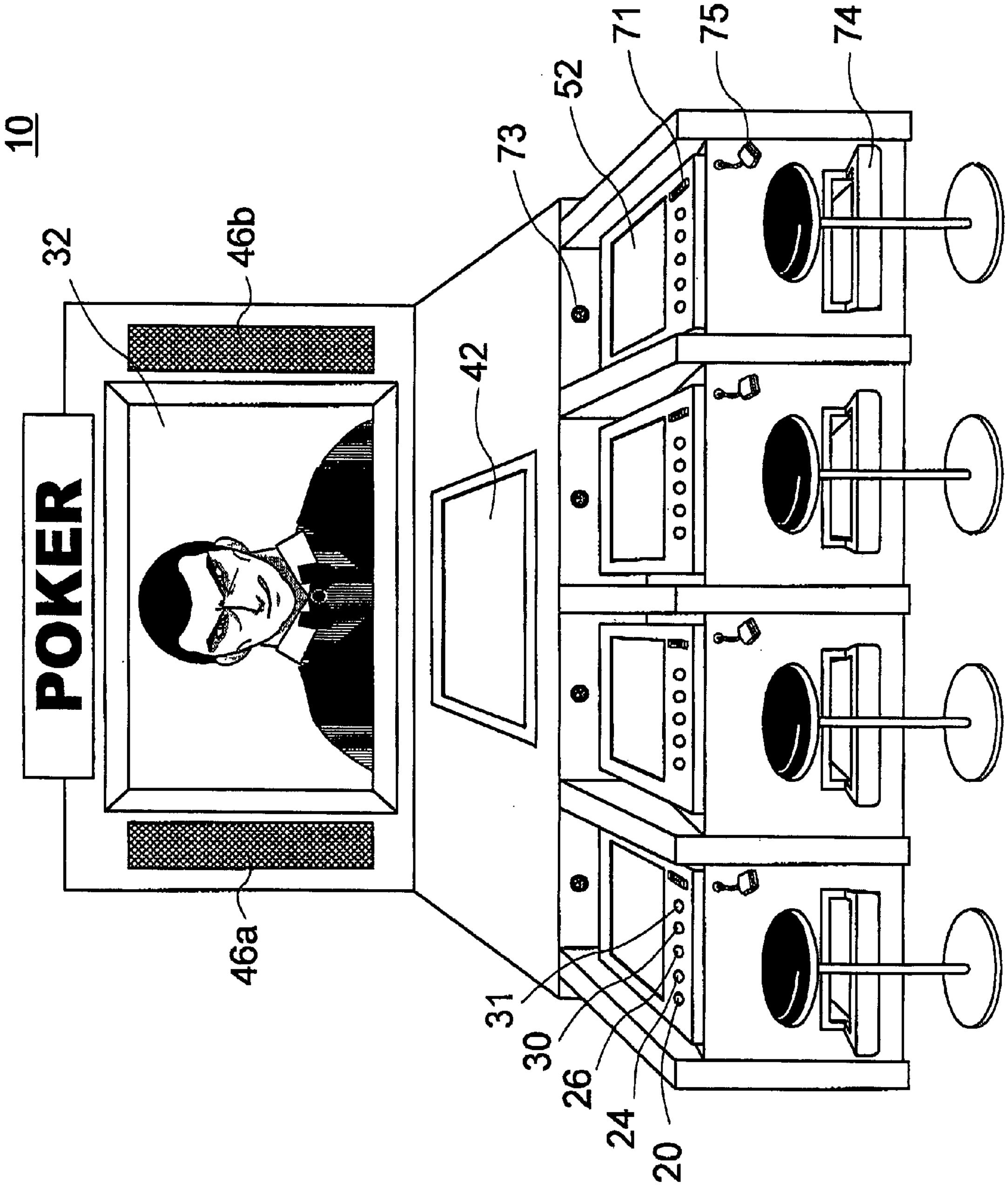
FIG. 1 is a front view of a general appearance of a poker gaming machine according to an embodiment of the present invention.
Figure 2:
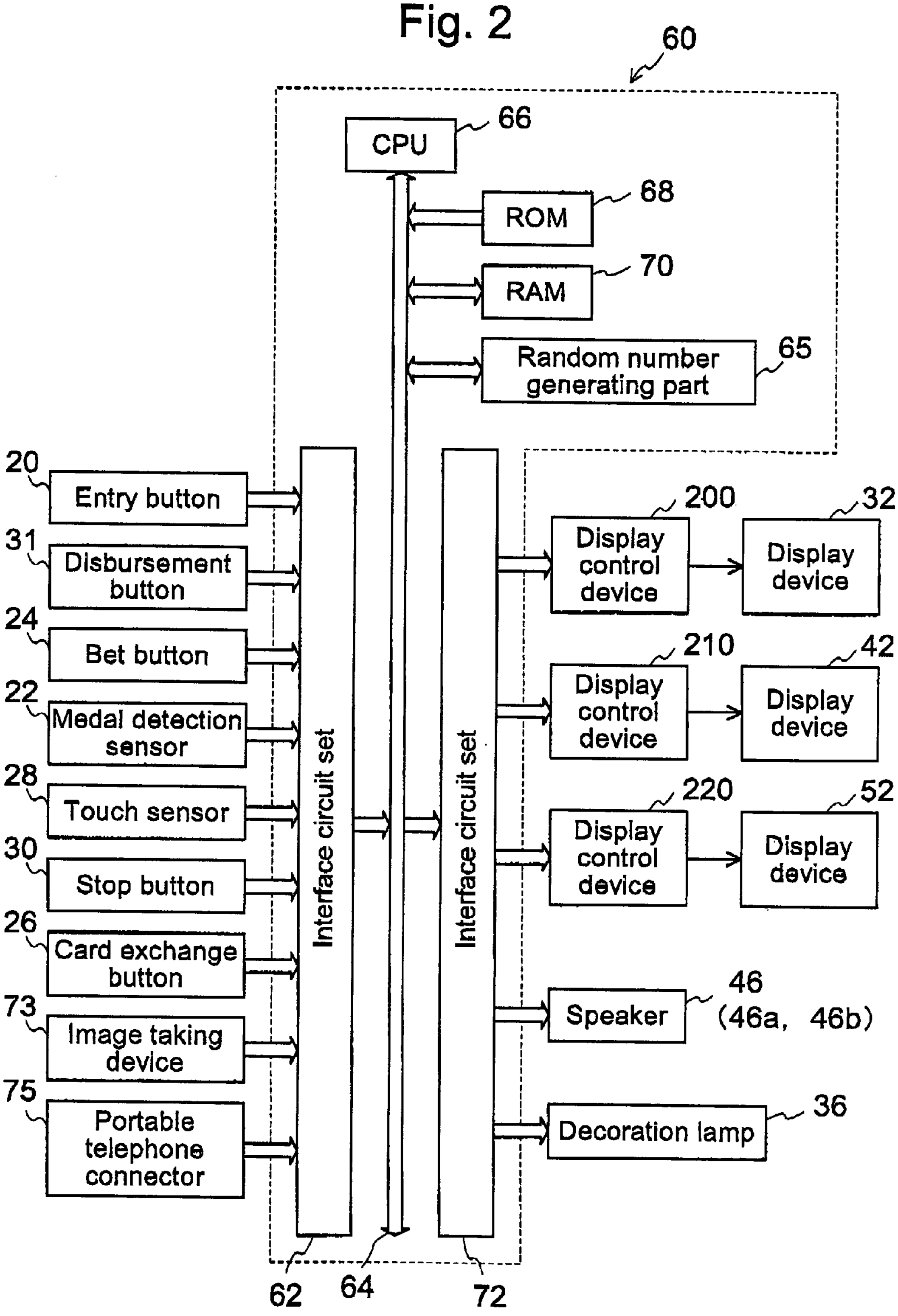
FIG. 2 is a block diagram of a main control circuit of the poker gaming machine according to an embodiment of the present invention.

FIG. 1 is an outline view showing the general appearance of a main casing and satellite machines of a poker gaming machine 10 of the present embodiment. As shown in FIG. 2, poker gaming machine 10 is arranged for a plurality of players to play poker and comprises the satellite machines (four in FIG. 1), provided, respectively, for each of the plurality of players, and the main casing.

A large display device 32 is installed at an upright part of the main casing, and a character figure image depicting a dealer that manages the progress of a poker game is displayed on this display device 32.

Also, speakers 46*a* and 46*b* are provided at the respective sides of display device 32 of the upright part and these speakers 46*a* and 46*b* are arranged to emit effect sounds and phrases, etc., emitted by virtual players to be described below, in accordance with the progress of a game.

Furthermore, a display device 42 is installed at a planar part of the main casing, and on display device 42 are displayed, for example, the dealer's cards, etc. At this planar part, the display surface of display device 42 is inclined towards the player side in order to enable players to view the display surface well.

Each satellite machine has a satellite display device 52 disposed therein, and on each display device 52 are displayed the cards of the player who plays a game on the corresponding satellite machine. Display device 52 is a touch panel type display device and, as shall be described later, has incorporated therein a touch sensor 28 (see FIG. 2).

Also each satellite machine has a medal slot 71 provided on its upper surface and a medal tray 74 provided at its lower part. A player bets medals from medal slot 71 and upon winning a game, receives the disbursement of medals at medal tray 74. As shall be described later, at an inner part of the satellite machine at which medal slot 71 is disposed, a medal detection sensor 22 (see FIG. 2) is built in and the loading of medals into poker gaming machine 10 by a player is detected by means of this medal detection sensor 22.

Furthermore each satellite machine is provided with a portable telephone connector (or connection adapter) 75, and by connection of these portable telephone connection adapters 75 with portable telephones owned by players, sending and receiving of message information among players is enabled. By such sending and receiving of message information, a player may form a team in cooperation with other players to realize new game methods by which a game can be made to proceed advantageously for the team, etc.

At the main casing side of display device 52 provided in each satellite machine is disposed an image taking device 73. Image taking device 73 is arranged with a CCD camera and captures the movements of the hands, and, especially, the expressions, etc., of the player playing a game on each satellite machine. The captured image is displayed on the above-described display device 42 or display device 52.

On the front side of display device 52 of each satellite machine are disposed various buttons that are used to make the game proceed. Entry button 20 is used when a player starts a game, that is, a player can start a game by loading medals via medal slot 71 and pressing entry button 20.

To the right side of entry button 20 are formed a bet button 24, a card exchange button 26, a stop button 30, and a disbursement button 31.

Bet button 24 is used when a player bets game media in a game and the betted quantity is increased in accordance with the number of times this button is pressed.

Card exchange button 26 is used for exchanging a card dealt in a game, and a player can exchange a card by selecting the card to be exchanged from among the cards displayed on display device 52 and pressing this card exchange button 26.

Stop button 30 is used when a player wishes to stop playing a game, and a player can quit the game by pressing this button.

Disbursement button 31 is a button by which a player receives the disbursement of game media, and a player can receive an allotment of medals from medal tray 74 by pressing this button.

[Arrangement of the Control Part of the Poker Gaming Machine]

FIG. 2 shows a block diagram of a control circuit of poker gaming machine 10, which is this invention's embodiment.

The above-mentioned medal detection sensor 22 is connected to an interface circuit set 62 of a main control circuit 60, and interface circuit set 62 is connected to input/output bus 64. A detection signal from medal detection sensor 22 is converted into a signal of predetermined form by interface circuit set 62 and then supplied to input/output bus 64. Input/output bus 64 is arranged for the input and output of data signals or address signals from and to a central processing circuit (referred to hereinafter as "CPU") 66. Also, a timer (not shown) to be described below is equipped inside CPU 66.

The above-mentioned entry button 20 is also connected to interface circuit 62 of main control circuit 60. Entry button 20 issues a press operation detection signal, indicating the detection of the pressing of the button by a player, to interface circuit set 62 and this signal is thereafter supplied to input/output bus 64.

Bet button 24, card exchange button 26, stop button 30, and disbursement button 31 are also connected to interface circuit set 62, and when any of these is pressed by a player, a detection signal is supplied to interface circuit set 62.

Yet furthermore, touch sensor 28, which is mounted to the touch panel of display device 52, portable telephone connection adapter 75, and image taking device 73 are connected to interface circuit set 62.

A ROM (read only memory) 68 and a RAM (random access memory) 70 are also connected to the above-mentioned input/output bus 64. ROM 68 has recorded therein a control program that controls the flow of the entirety of a game played on poker gaming machine 10. ROM 68 furthermore stores initial data for executing control programs, a program for controlling the blinking operation pattern of a decoration lamp 36 incorporated in poker gaming machine 10, programs for performing display control of display device 32, 42, or 52, etc. RAM 70 stores the values of flags and variables used in the above-mentioned programs.

An interface circuit set 72 is also connected to input/output bus 64. Speakers 46 (46*a* and 46*b*) and decoration lamp 36 are connected to interface circuit set 72, and interface circuit set 72 supplies drive signals and drive power to control each of the above-mentioned devices in accordance with the results of computational processes performed at CPU 66.

Furthermore, a random number generating part 65 for generating random numbers is connected to input/output bus 64. When an instruction for generating a random number is issued from CPU 66 to random number generating part 65, random number generating part 65 generates a random number within a predetermined range and supplies a signal indicating the value of this random number to input/output bus 64. CPU 66 determines the condition of progress of the game from this generated random number. An internal lottery process, which is carried out in step S30 as shall be described later, is thereby carried out. The random number that is generated from random number generating part 65 is recorded as data indicating a lottery result in RAM 70.

Yet furthermore, display control devices 200, 210, and 220 are also connected to interface circuit set 72, and display control device 200 generates, based on an image display instruction generated from main control circuit 60, a drive signal for driving display device 32 connected to display control device 200, display control device 210 generates, based on an image display instruction generated from main control circuit 60, a drive signal for driving display device 42 connected to display control device 210, and display control device 220 generates, based on an image display instruction generated from main control circuit 60, a drive signal for driving display device 52 connected to display control device 220.

[Operation of the Poker Gaming Machine]

Figure 3:
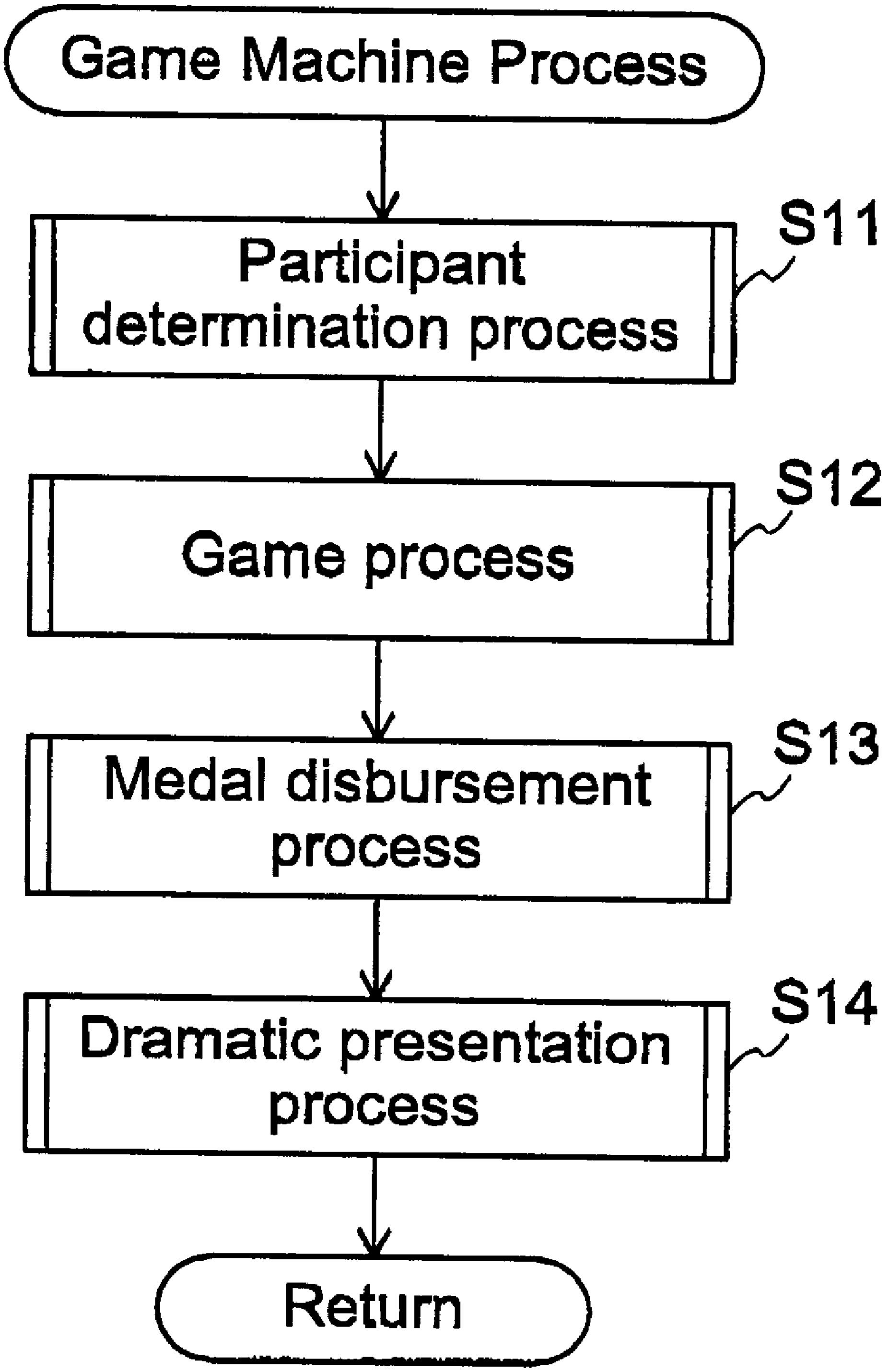
FIG. 3 is a flowchart of a control process executed by a poker gaming machine according to an embodiment of the present invention.

A subroutine for controlling poker gaming machine 10, which is executed by the above-described main control circuit 60, is illustrated in FIG. 3 onwards. In the following, it shall be deemed that poker gaming machine 10 has been started in advance, the variables used in the above-described CPU 66 are initialized to predetermined values, and steady-state operation is being carried out.

First with poker gaming machine 10, a participant determination process is executed as shown in FIG. 3 (step S11). In this process, CPU 66 detects, by means of medal detection sensor 22, whether or not medals have been loaded into medal slot 71 and performs a process in accordance with this detection result as shall be described later. When this process is ended, a transfer to step S12 is performed.

Next, a game process is performed (step S12). In this process, CPU 66 executes the processes from making a game progress, starting from the dealing of cards by a dealer. The details of the game process shall be described later. When this process is ended, a transfer to step S13 is performed.

Next, a medal disbursement process is performed (step S13). In this process, CPU 66 performs a process of disbursing game media (medals in the present embodiment) in accordance with a benefit won by a player. When this process is ended, a transfer to step S14 is performed.

Next, a dramatic presentation process is performed (step S14). In this process, CPU 66 controls the decorative lighting by decoration lamp 36. Also, sounds and voices for dramatic presentation are output from speakers 46*a* and 46*b* and the various display devices are made to reproduce dramatic presentation images. When this process is ended, the present subroutine is ended immediately.

<Participant Determination Process>

The participant determination process routine that is called in step S11 shall now be described based on step 11. This invention's poker gaming machine is "a gaming machine with which a plurality of players, including at least one virtual player who is not a real player, play a game against each other." In the following, an embodiment that is favorable as a participant determination method of this invention shall be described.

Figure 4:
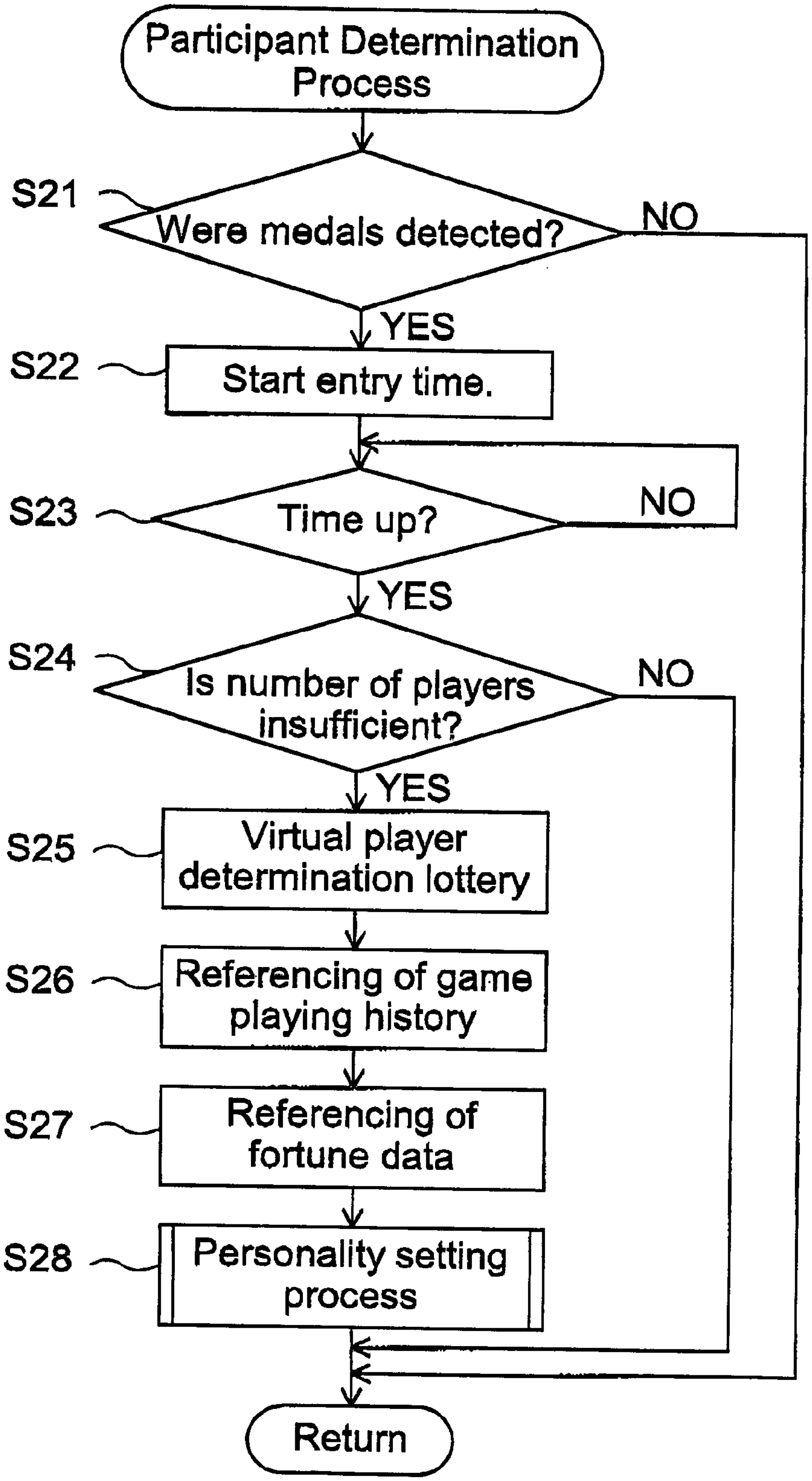
FIG. 4 is a flowchart of a control process executed by the poker gaming machine according to the embodiment of the present invention.

As shown in FIG. 4, first with poker gaming machine 10, a process of judging whether or not medals have been detected is executed (step S21).

In this process, CPU 66 judges, by means of the detection signal sent from medal detection sensor 22, whether Or not medals have been loaded into medal slot 71. If it is judged in this step that medals have not been detected, the present subroutine is ended immediately. On the other hand, if it is judged in this step that medals have been detected, a transfer to step S22 is performed.

Next, a process of starting an entry time is executed (step S22).

An entry time is a concept indicating the time for gathering other players. With poker gaming machine 10 of the present embodiment, the gathering of other players for participation is performed within a predetermined time of 10 to 20 seconds from the determination by one player to participate in a poker game. A player wishing to participate in a poker game is deemed to be participating when he/she loads a predetermined number of medals via medal slot 71 and presses entry button 20.

Next, a process of judging whether or not the entry time has ended is executed (step S23).

Since as mentioned above, the entry time is a duration of 10 to 20 seconds, CPU 66 judges, at predetermined timings, whether or not this amount of time has elapsed. In this process, if it is judged that the entry time has not ended, a return to step S23 is performed and the process of judging whether or not the entry time has ended is executed again. On the other hand, if it is judged that the entry time has ended, CPU 66 executes the next process.

Next, a process of judging whether or not the number of players is insufficient is executed (step S24).

Here, the "number of players" refers to the number of players participating in a poker game played on poker gaming machine 10, and with poker gaming machine 10 of the present embodiment, a game is played with at least three or more players. With this invention's gaming machine, when the number of players is insufficient, "virtual players," who are not real players, are made to participate in the game.

If a "no" judgment is made in the present step, this means that "the number of players is not insufficient," and in this case, CPU 66 ends the present subroutine immediately. On the other hand, if a "yes" judgment is made in the present step, this means that "the number of players is insufficient" and in this case, CPU 66 executes the process of step S25.

Next, a process of performing a virtual player determination lottery is executed (step S25).

A virtual player is a concept as opposed to a real player. The virtual player may refer to a player generated by CPU 66 of the poker gaming machine 10. According to the present invention, a gaming machine may prepare a plurality of virtual players, and when the number of players is insufficient, selects, from among these virtual players, players corresponding to the insufficiency in the number of players by lottery.

FIG. 5 is a chart indicating the types and personalities of virtual players. As shall be described later, each virtual player has a basic personality that is set in advance and the personality of a virtual player for a certain day is set based on this basic personality and from a game playing history and superiority data. The lottery for determining virtual players is carried out by the above-described random number generating part 65.

Next, a process of referencing the game playing history is executed (step S26).

The game playing history refers to the results of games that a virtual player determined in the above-described S25 has played. As shall be described later, the game playing history is an element that is reflected in the learning ability of a virtual player. A virtual player with a high learning ability becomes stronger the more games the player plays since experiences of past games are made use of in subsequent games. On the other hand, such a virtual player may become careful in playing and this may affect the degree as a gambler, which shall be described later. When the process of referencing the game playing history ends, CPU 66 performs a transfer to step S27.

Next, a process of referencing fortune data is executed (step S27).

Fortune data refers to data on the fortune, especially, the fortune concerning gambling and money of a player on a certain day. For each virtual player, a suitable date of birth, blood type, etc., are set and his/her fortune is made to change according to day in accordance with the biorhythm of fortune telling. In this step, a process of referencing this fortune and making the result be reflected in the setting of the personality of a virtual player, which shall be described later, is performed. When the process of referencing fortune data ends, CPU 66 executes the process of step S28.

Next, a personality setting process is executed (step S28).

The personality setting process refers to the process of making the results of the referencing of the game playing history and fortune data, which were carried out in the prior steps S27 and S28, be reflected in a virtual player's personality and thereby setting the personality of the virtual player. Details concerning the personality setting process shall be described later with reference to FIG. 5.

When the personality setting process ends, CPU 66 ends the present subroutine immediately.

An example of a database used in the personality setting process of the above-described step S28 is shown in FIG. 5.

FIG. 5 is a database for setting the basic personality that is determined according to each virtual player. Examples of basic personalities include "aggressive," "sly," "honest," "wise," etc. The above-mentioned basic personality is determined by expressing the five personality parameters of "degree as a gambler," "acting ability," "learning ability," "emotional stability," and "circumstance ascertaining ability" in numerical values.

For example, with an aggressive character, the degree as a gambler is set high and the emotional stability is set low. Also, for an honest character, the acting ability is set low.

The basic personality that is determined by these five personality parameters is determined initially, and the values of the personality parameters are changed as a virtual player plays games or in accordance with the fortune of the day, etc.

<Game Process>

Figure 6:
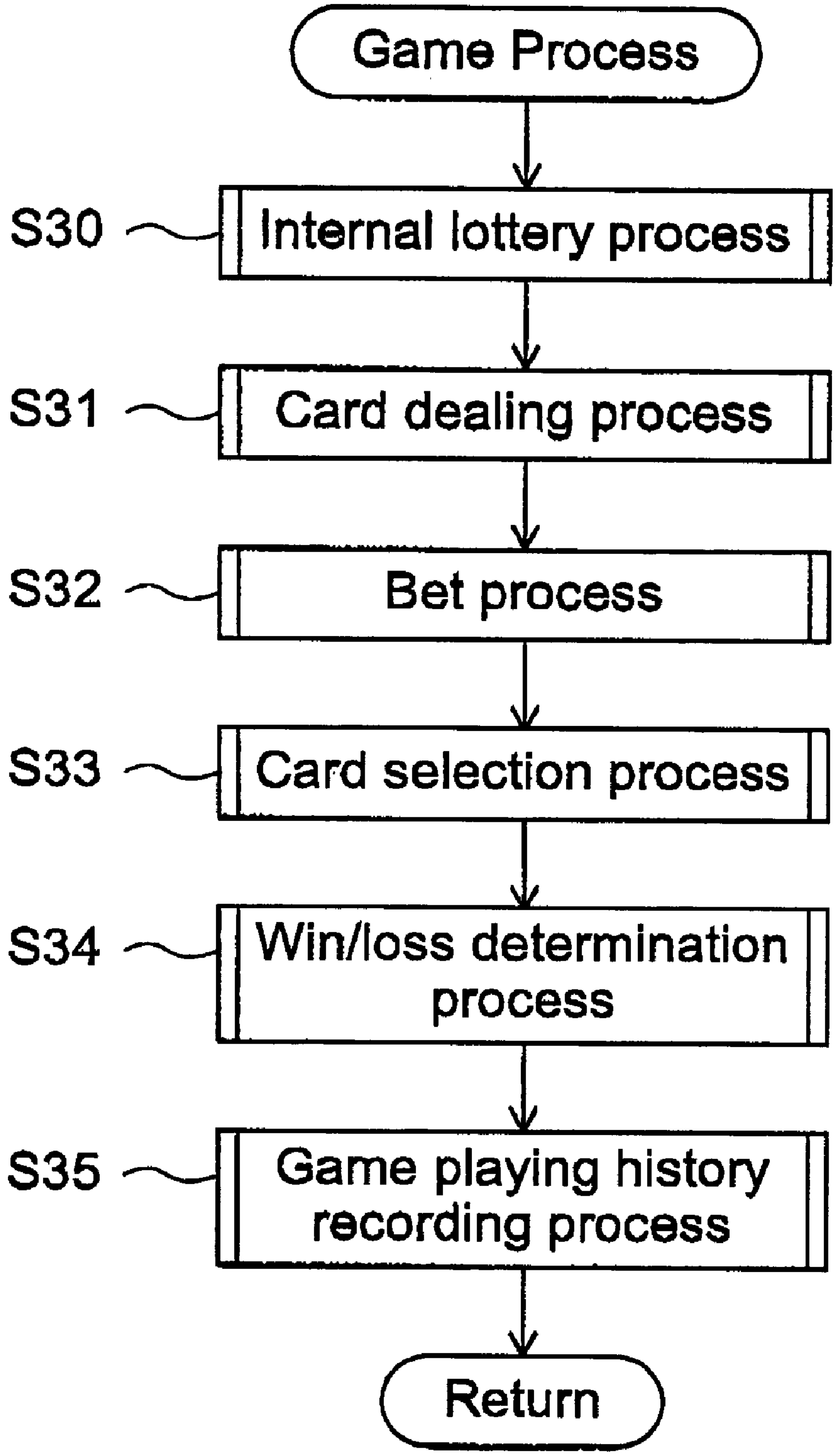
FIG. 6 is a flowchart of a control process executed by the poker gaming machine according to the embodiment of the present invention.

The game process routine that is called in step S12 shall now be described with reference to FIG. 6.

First, CPU 66 executes an internal lottery process (step S30).

The internal lottery process is carried out by random number generating part 65 upon receiving an instruction from CPU 66. The random number obtained from this random number generating part 65 is recorded as data indicating the lottery result in RAM 70, and CPU 66 references this data to determine the conditions of progress of a game. When the internal lottery process ends, CPU 66 executes the process of step S31.

Next, CPU 66 executes a card dealing process (step S31).

Based on the game program recorded in ROM 68, CPU 66 makes the dealer, displayed on display device 32, deal cards to players playing the game on the satellite machines. As mentioned above, the dealt cards are displayed on display devices 52. The details of the card dealing process shall be described later. When the card dealing process ends, the process of step S32 is executed, Next, CPU 66 executes a bet process (step S32).

"Bet" refers to the increasing of the betted quantity by a player to whom cards have been dealt. In this process, CPU 66 judges whether or not a player has pressed the bet button and if it is judged that the bet button has been pressed, a corresponding bet process is performed. The details of the bet process shall be described later. When the bet process ends, the process of step S33 is executed.

Next, CPU 66 executes a card selection process (step S33).

The "card selection process" refers to a process by which a player selects some cards from among the cards that have been dealt. Poker gaming machine 10 of the present embodiment is mainly for performing a poker game called 7-Card-Stud. In this poker game, the dealer deals seven cards to each player and each player competes his/her superiority with respect to other players from a combination of five cards selected arbitrarily from among the seven cards A player selects the five cards to be selected by touching the touch panel type display device 52. CPU 66 receives a signal from touch sensor 28 to detect that a card has been selected.

Though this embodiment's poker gaming machine 10 is mainly arranged to carry out a 7-Card-Stud game, this invention is not limited thereto and may be arranged to play another type of poker game. In this case, the card selection process of the present step corresponds to a card exchange process of selecting a card and requiring the exchange of the selected card to the dealer. When the card selection process ends, CPU 66 executes the process of step S34.

Next, CPU 66 executes a win/loss determination process (step S34).

The win/loss determination process is a process of determining win or loss by comparing combinations of cards selected by players as described above. CPU 66 compares the cards selected by the respective players in the above-described process of step S33, judges the winning combinations of the cards to determine the superiority or inferiority of all players, and thereby determines win or loss. When the win/loss determination process ends, CPU 66 executes the process of step S35.

Next, CPU 66 executes a game playing history recording process (step S35).

The game playing history recording process is a process of recording the game playing history to be referenced in the above-described step S26 of FIG. 4, and is a process of recording the game playing history in RAM 70 each time a game ends.

When the process of recording the game playing history ends, CPU 66 ends the present subroutine immediately.

<Card Dealing Process>

Figure 7:
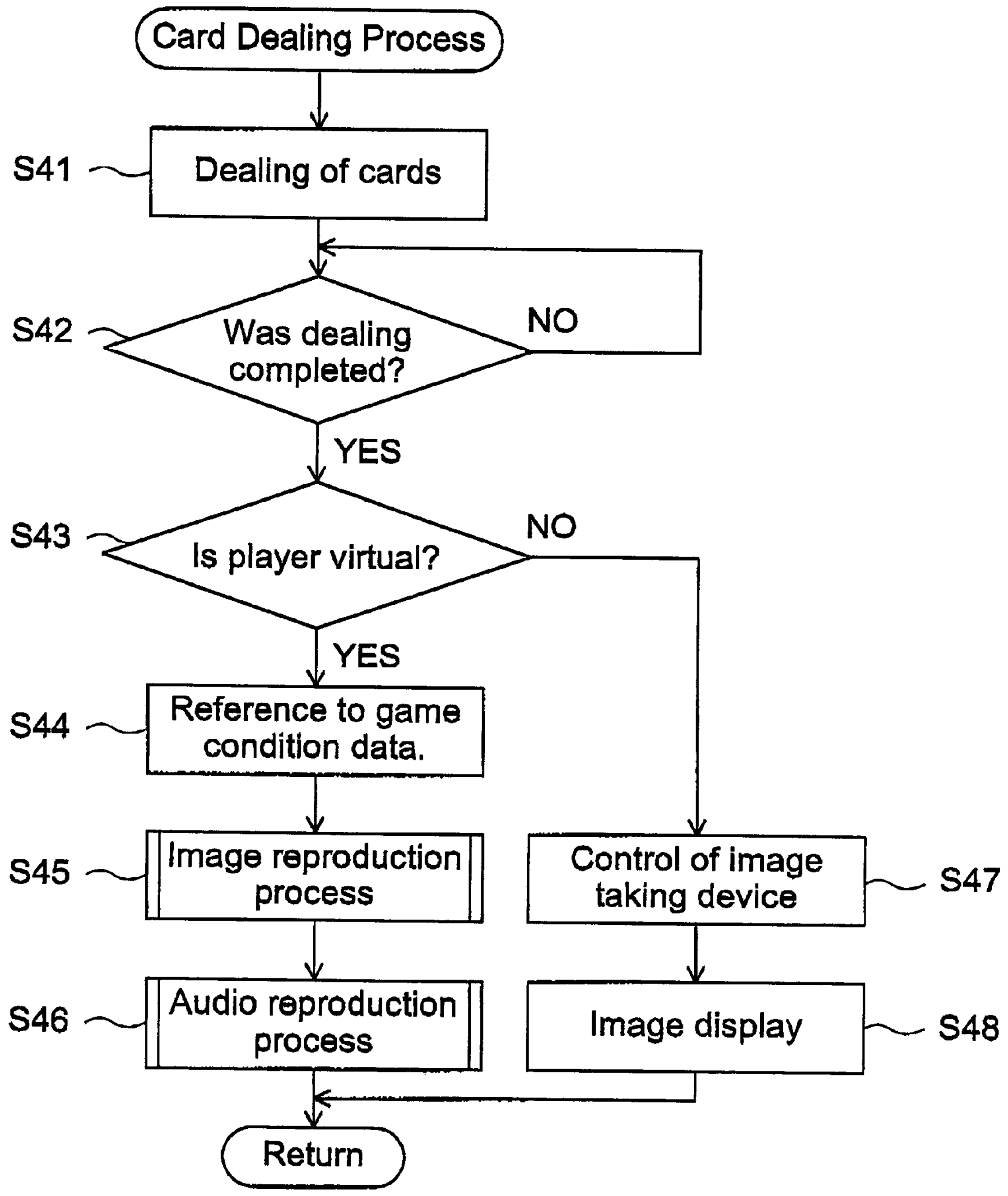
FIG. 7 is a flowchart of a control process executed by the poker gaming machine according to the embodiment of the present invention.

The card dealing process routine that is called in step S31 shall now be described with reference to FIG. 7.

First, CPU 66 executes a process of dealing a card (step S41).

As mentioned above, the card dealing process is a process in which the dealer displayed on display device 32 is made to deal a card upon receiving an instruction from CPU 66. The card to be dealt is based on the lottery result of the internal lottery process carried out priorly in step S30. When the card dealing process ends, CPU 66 performs a transfer to the process of step S42.

Next, CPU 66 executes a process of judging whether or not dealing has been completed (step S42).

Whether or not dealing has been completed is judged by CPU 66. If CPU 66 judges that dealing has not been completed, the process of judging whether or not dealing has been completed is executed again (step S42). On the other hand, if it is judged that the dealing of cards has been completed, a transfer to the process of step S43 is carried out.

Next, CPU 66 executes a process of judging whether or not a player is a virtual player (step S43).

The process of judging whether or not a player is a virtual player refers to a process of judging whether the player to whom a card has been dealt priorly in step S41 is a real player or is a virtual player (a player, who does not really exist and whose characteristics and changes in expression are controlled by CPU 66 as described above). Here, if a player is a virtual player, the numerical value of "1" is provided to the type of player recorded in RAM 70, and if a player is a real player, the numerical value of "0" is provided. CPU 66 carries out the present process by referencing the numerical value that indicates the type of player in RAM 70.

With poker gaming machine 10 of the present embodiment, expressions of players are displayed on display device 42 at various timings, including that at which the dealing of a card by CPU 66 is ended, and as shall be described later, in the case of a real player, a video image captured by image taking device 73 is displayed while in the case of a virtual player, a priorly prepared image is selected and displayed. Thus a player whose expression is displayed on display device 42 can put on an act to other players to make his/her strategic circumstances advantageous, and on the other hand, other players can view such expressions to check the present strategic circumstances. Tactical interactions are thus carried out among players and the game heats up.

If CPU 66 judges that a player is a virtual player, a transfer to step S44 is performed. On the other hand, if CPU 66 judges that player is not a virtual player, a transfer to step S47 is performed.

Next, CPU 66 executes a process of referencing game condition data (step S44).

The game condition data refers to data such as shown in FIGS. 8A and 8B. Game condition data are recorded in RAM 70, and with the data shown in FIG. 8A, the data items are the order of entry, number of times of betting, betted quantity, average betting time, and number of wins of each real player (with the present embodiment, it is assumed that four players are participating in the game).

Meanwhile, the data shown in FIG. 8B express the personalities of the respective players based on the data shown in FIG. 8A. With the data shown in FIG. 8B, the personality of each player is analyzed under the items of carefulness, degree as a gambler, decisiveness, and gaming strength, and also recorded are data indicating whether or not the playing of game is presently in progress.

With the data of FIG. 5B, the numerical value of the item of "carefulness" is determined based on the data of "order of entry" and "number of times of betting." The numerical value of the "degree as a gambler" is determined based on the "bettingquantity," the numerical value of the "decisiveness" is determined based on the "average betting time," and the numerical value of the "gaming strength" is determined based on the "number of wins."

In the present step, CPU 66 references the game condition data of FIGS. 8A and 8B, and these data are utilized in the processes of step S45 onwards, which shall be described below.

Next, CPU 66 executes an image reproduction process (step S45).

The image reproduction process refers to a process of selecting reaction (response) images for the respective virtual players based on the game condition data referenced priorly in step S44 and reproducing the selected image.

CPU 66 determines the reactions (responses) of the virtual players based on data obtained priorly in step S44. Specifically, a process such as the following is carried out. That is, if among real players who are presently still playing the game, there is a real player who has data of a high numerical value for the "gaming strength" item, an image of acting as if a disadvantageous card has been dealt is selected as the reaction (response) image of a virtual player and the reproduction of this image is determined.

The response image data are recorded in ROM 68 and CPU 66 selects one from among these image data. Though for the selection, an image that is randomly chosen by lottery may be selected, the personality of a real player may be used as a search condition to narrow the choices and an image may be selected from among the narrowed choices. When the image reproduction process ends, CPU 66 performs a transfer to step S46.

Next, CPU 66 executes an audio reproduction process (step S46).

The audio reproduction process refers to a process of selecting audio data to match the virtual player images selected priorly in step S45.

As with the above-mentioned response image data, the audio data are also recorded in ROM 68 and from these data, data corresponding to the images selected priorly in step S45 are selected.

Figure 9A:
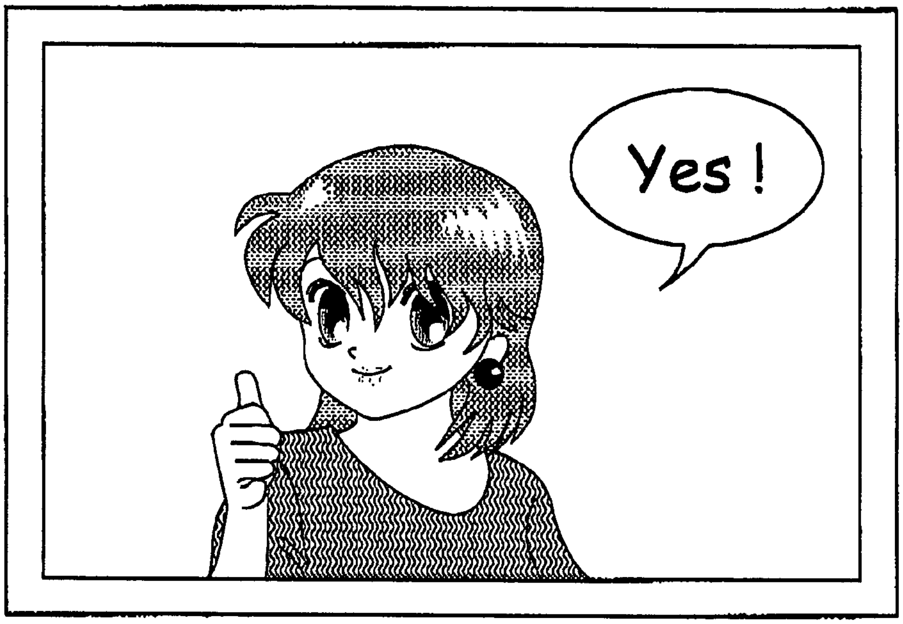
FIG. 9A shows an example of an image displayed on the display device of the poker gaming machine according to the embodiment of the present invention.
Figure 9B:
FIG. 9B shows an example of an image displayed on the display device of the poker gaming machine according to the embodiment of the present invention.

FIGS. 9A and 9B show the results of executing the processes of step S45 and step S46.

FIG. 9A shows a display example of display of an image that shows a virtual player to be jubilant. As shown in the Figure, in this image, the virtual player takes on a jubilant pose with the balloon, "Yes!" Meanwhile, FIG. 9B shows a display example of display an image showing a virtual player to be disappointed. As shown in the Figure, in this image, the virtual player takes on a disappointed pose with the balloon, "No good . . . ." As mentioned above, these images are selected suitably, and for example, by making an image showing a virtual player to be jubilant as in FIG. 9A be displayed when a good card is dealt and by making the same image showing a virtual player to be jubilant as in FIG. 9A be displayed in the opposite situation when a bad card is dealt, other players can be put in a confused state.

By carrying out processes such as the above, images of reactions (responses) of virtual players upon viewing a dealt card are selected and reproduced in accordance with the personalities of real players and based on the personalities shown priorly in FIG. 5. This corresponds to "making the above-mentioned response image data, stored in the above-mentioned response image data storage means, be reproduced in accordance with the conditions of the game played on the above-mentioned gaming machine," and since the reactions of virtual players are thus adjusted according to the participants of the game, the enjoyment of carrying out tactical interactions is increased for real players.

When the audio reproduction process ends, CPU 66 ends the present subroutine immediately.

If in the prior step S43, it is judged that the player to whom a card is dealt is not a virtual player, a process of controlling an image taking device is executed (step S47).

That a player is judged not to be a virtual player in step S43 means that this player is a real player, and in order to capture the reaction of this player when a card is dealt, CPU controls image taking device 73 (see FIGS. 1 and 2). Upon receiving a control signal issued from CPU 66, image taking device 73 captures the expression, etc., of the player.

Next, CPU 66 executes an image displaying process (step S48). The image displaying process refers to the process of displaying, on display device 42, the expression, etc., of the player that was captured priorly in step S47. CPU 66 sends a drive signal to display control device 210 and makes the image captured by image taking device 73 be displayed on display device 42.

Since by carrying out such processes, a player's state in a game can be intuited from his/her reaction by other real players, the enjoyment of players carrying out tactical interactions with each other is increased.

When the image displaying process ends, CPU 66 ends the present subroutine immediately.

[Bet Disbursement Process]

Figure 10:
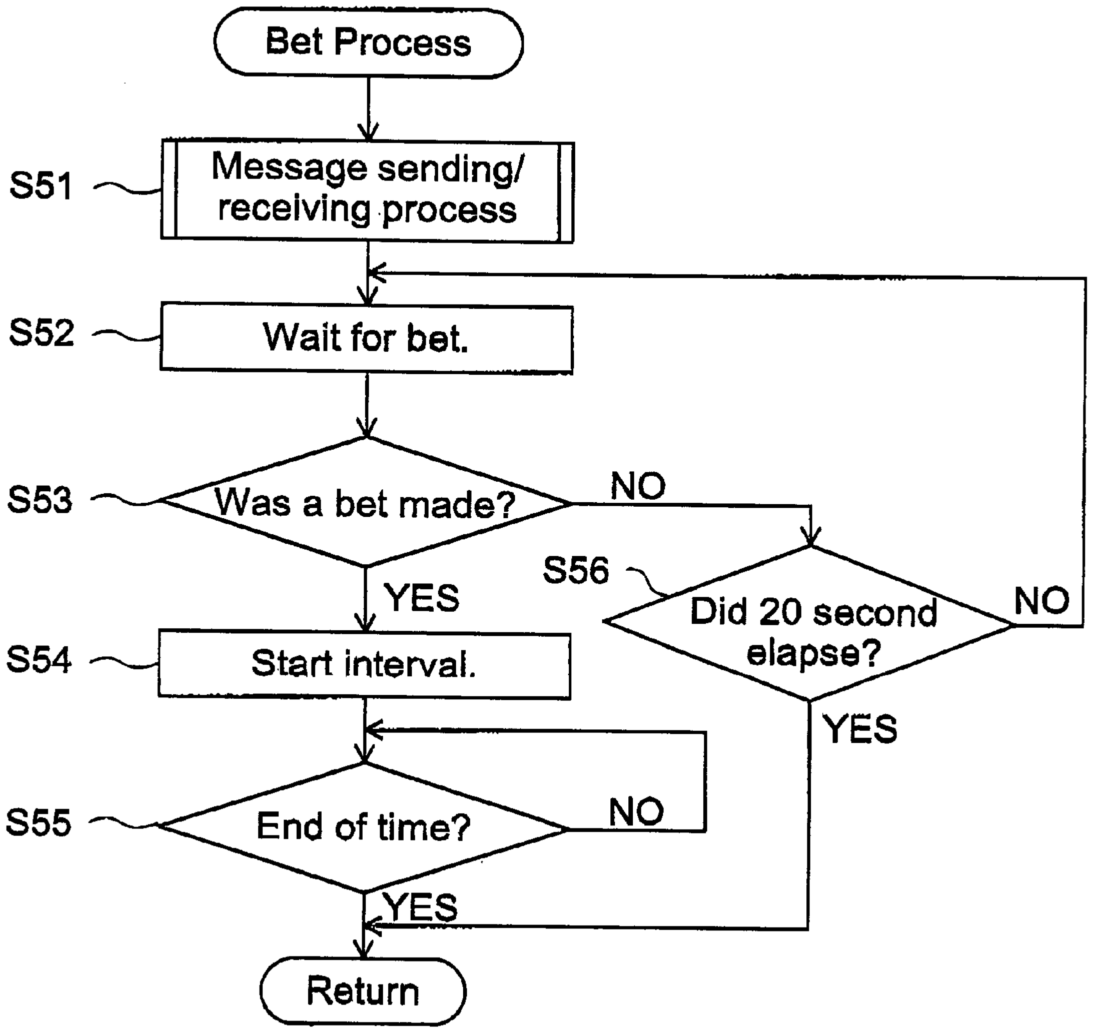
FIG. 10 is a flowchart of a control process executed by the poker gaming machine according to an embodiment of the present invention.

The bet process routine that is called in step S32 shall now be described with reference to FIG. 10.

First, CPU 66 executes a message sending/receiving process (step S51).

The message sending/receiving process refers to a process in which CPU 66 sends or receives audio or character information, etc., input by real players via portable telephones connected to portable telephone connection adapters 75. Poker gaming machine 10 of the present embodiment is arranged to enable players to send and receive messages to and from each other, and a player playing a game on this gaming machine is thereby enabled to send and receive message information from other players and use teamwork to play a game in an advantageous manner over other players. When the message sending/receiving process ends, CPU 66 performs a transfer to step S52.

Next, CPU 66 enters a bet waiting state (step S52).

As shall be described later, poker gaming machine 10 of the present embodiment is arranged to receive, upon receiving a bet from a participant, bets from other players within a predetermined time. Thus in the present step, a bet from a player is waited.

When the bet waiting state is entered, the expressions of the respective players may be arranged to be displayed on display device 42 or 52. At this time, images of expressions concerning virtual players may be selected suitably and displayed according to the game state. With regard to the method of selecting images in accordance with the game state, game condition data (see FIG. 8) are referenced as in the method described using FIG. 7. Meanwhile with regard to real players, expressions captured by image taking devices 73 are arranged to be displayed on display parts.

Next, CPU 66 executes a process of judging whether or not a bet has been made (step S53).

As mentioned above, poker gaming machine 10 of the present embodiment is arranged to receive, upon receiving a bet from a participant, bets from other players within a predetermined time. CPU 66 judges that a bet has been made by receiving the signal generated by the pressing of a bet button 24 (see FIGS. 1 and 2).

If is judged that a bet has been made, CPU 66 executes the process of step S54. On the other hand, if it is judged that a bet has not been made, CPU 66 executes the process of step S56.

Next, CPU 66 executes a process of starting an interval (step S54).

This "interval" refers to a priorly determined time for waiting for the receiving, upon receiving a bet from a participant, of bets from other players within a predetermined time. This interval is started by the starting of counting by a timer incorporated in CPU 66. When a player makes a bet, other players must make a bet by pressing bet buttons 24 within the predetermined amount of time.

Next, CPU 66 executes a process of judging whether or not the time is up (step S55).

The "time" here refers to the above-mentioned interval. When it is determined from the timer incorporated in CPU 66 that the predetermined time has elapsed, CPU 66 judges that the interval is over.

If CPU 66 judges that the time is not up, a return to step S55 is performed and the process of judging whether or not the time is up is performed again. On the other hand, if it is judged that the interval time is up, CPU 66 ends this subroutine immediately.

If in the prior step S53, it is judged that a bet has not been made, a transfer to step S56 is performed and a process of judging whether or not 20 seconds have elapsed is executed (step S56).

This time of 20 seconds is the time from the start to the end of waiting for the making of a bet. Each player must decide whether or not to make a bet within this time of 20 seconds, and with a game played on poker gaming machine 10 of the present embodiment, if not even one player makes a bet within this time, the game ends.

If CPU 66 judges that 20 seconds have not elapsed, a return to step S52 is performed to enter the bet waiting state again. On the other hand, if CPU 66 judges that 20 seconds have elapsed, the present subroutine is ended immediately.

Though a poker gaming machine installed in a game hall was used to described an embodiment above, this invention is not limited thereto and may be arranged for performing a game with other players via a communication line on a terminal device connected to a server.

[Arrangement of a Server]

Figure 11:
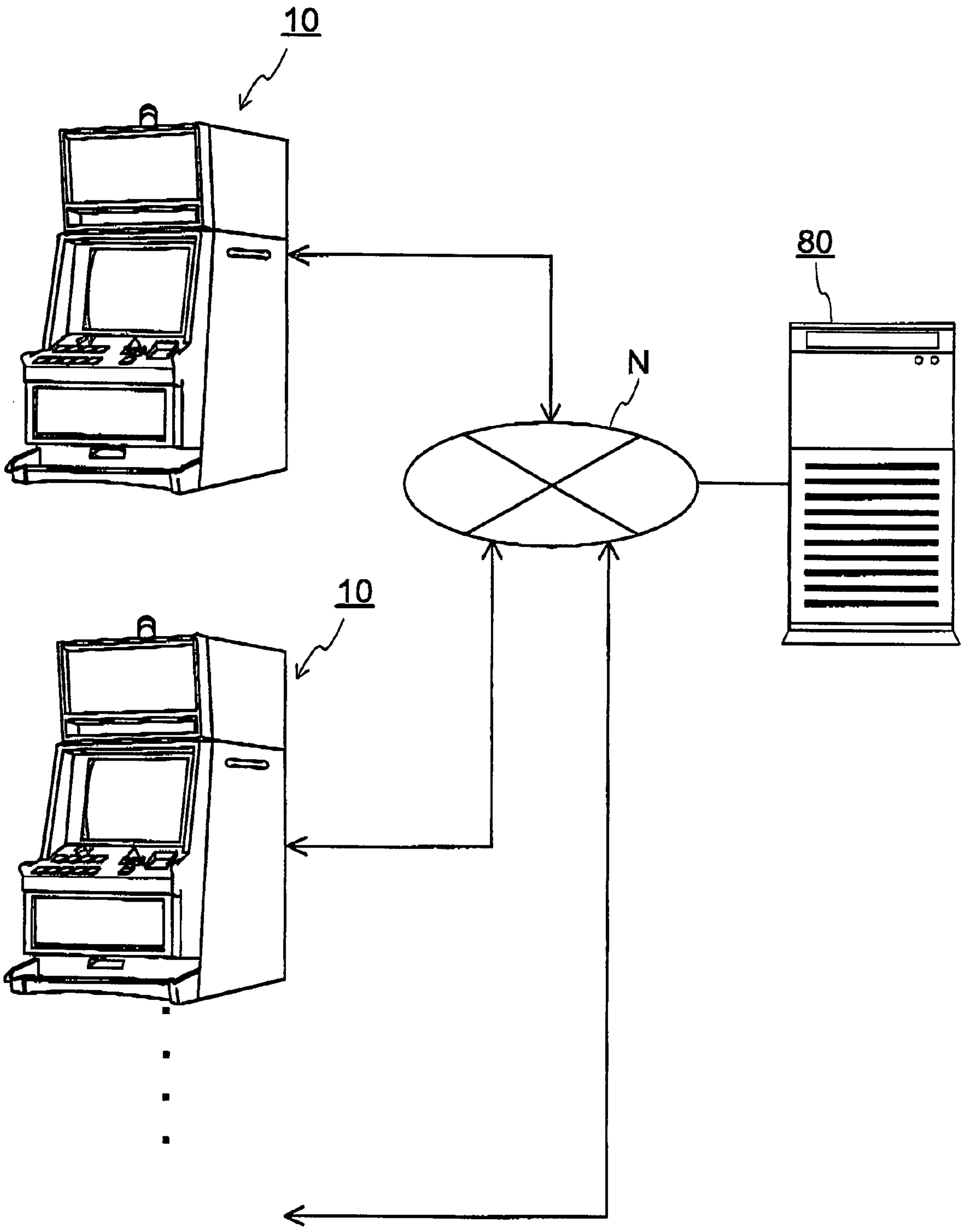
FIG. 11 is a diagram illustrating an outline of an arrangement wherein a server and gaming machines are connected via a network.

Though the above-described embodiment was arranged with just a gaming machine 10, gaming machines 10 may be connected to a server 80 via communication lines and a network N and be enabled to perform the sending and receiving of a predetermined information with server 80 as shown in FIG. 11. Specifically, server 80 performs the lottery process as that described above and supplies the lottery data to gaming machines 10, which are terminal devices, and each gaming machine 10 may be made to display, upon receiving the lottery data, images of the players. Needless to say, server 80 may be arranged to select images to be displayed and supply the image data to gaming machines 10, and each gaming machine 10 may be made to display, upon receiving the image data, images based on the image data.

Furthermore, by an arrangement such as shown in FIG. 11, even when a plurality of gaming machines 10 are installed at locations of distances that do not enable the sending and receiving of data by a single cable from a plurality of servers 80 or even when a plurality of gaming machines are installed at locations that are separated from each other, the plurality of gaming machines 10 can be controlled in an integral manner via a public telephone line network or other communication line.

Here, the objects of this invention can also be achieved by using personal computers, portable telephones, etc., as the terminal devices connected to the server, and the same actions and effects as those described above may be obtained by arranging the server to send, to these terminal devices, image data for display of images on the display parts of such terminal devices, etc., data indicating such image data, audio data, etc.

Also, though the above embodiment was described using a poker gaming machine, this invention is not limited thereto and the objects of this invention can also be achieved with mahjong, Japanese flower cards, and other games that is played by a plurality of players using cards.

Furthermore, though with the above-described embodiment, an image that captures a change in the expression of a player when the game state changes is mainly displayed on display device 42, this invention is not limited thereto, and such an image may be displayed on the main display device installed in the gaming machine (display device 32 in the case of the embodiment) or on the display devices installed individually for the respective players (display devices 52 in the case of the embodiment).

Yet furthermore, though with the above-described embodiment, only the change of expression of a player for which the game state changed directly (that is, the player to whom a card is dealt or the player who made a bet) is displayed on a display device, this invention is not limited thereto, and arrangements may be made to display the expressions of all players at all times.

The above-described embodiment and effects thereof are those that can be considered to be the most favorable arising from this invention, and favorable embodiments and effects of this invention are not limited to those described above.

With this invention, "a gaming machine comprising: a display part, displaying the states of a game; and a game control means, controlling the states of a game in accordance with input information from players; and with which a plurality of players, including at least one virtual player who is not a real player, play a game against each other," is equipped with "an image data storage means, storing a plurality of image data that are displayed on the above-mentioned display part as images of the above-mentioned virtual players; and a response image data storage means storing response image data, which are provided individually according to each virtual player and displayed as images on the above-mentioned display part in accordance with the circumstances of the game played on the above-mentioned gaming machine;" to enable "making the above-mentioned response image data, stored in the above-mentioned response image data storage means, be reproduced in accordance with the conditions of a game played on the above-mentioned gaming machine."

What is claimed is:

1. A gaming machine comprising: a display part for displaying a state of a game; and a game control means for controlling the state of the game in accordance with information input by a plurality of players; wherein the plurality of players include at least one real player and at least one virtual player who is not a real player and the players play the game against each other, the gaming machine comprising:

an image taking means for taking an image of the real player, said image taking means being installed in the gaming machine;

an image data storage means for storing a plurality of image data that are displayed on said display part as images of the virtual player and the real player;

a response image data storage means for storing response image data of each virtual player in relation to the state of the game, the image data being displayed as an image in said display part at a predetermined state of the game played with the gaming machine;

a detection means for detecting player insufficiency in playing the game with the gaming machine; and a virtual player selection means for selecting the virtual player according to a detection result by said detection means;

wherein said game control means has the virtual player participate in the game being played with the gaming machine, the virtual player being selected by said virtual player selection means according to the detection result by said detection means; and wherein said game control means causes said display part to show an image of the real player being taken at a predetermined timing by said image taking means, and the response image data being stored by said response image data storage means according to the state of the game being played with the gaming machine.

2. The gaming machine according to claim 1, wherein the predetermined timing comprises a timing at which a change is about to occur, a change is occurring, or a change has occurred in the game state with at least one player among the plurality of players playing the game with the gaming machine.

3. The gaming machine according to claim 2, wherein each virtual player is set to have each predetermined personality such that a first virtual player shows a first response image corresponding to a first expression, which differs from a second expression corresponding to a second response image by a second virtual player on at least one state of the game or a change of the state of the game.

4. The gaming machine according to claim 1, wherein each virtual player is set to have each predetermined personality such that a first virtual player shows a first response image corresponding to a first expression, which differs from a second expression corresponding to a second response image by a second virtual player on at least one state of the game or a change of the state of the game.

5. A gaming machine comprising:

a display part for displaying a state of a game;

a game control means for controlling the state of the game in accordance with information input by a plurality of players, wherein the plurality of players include at least one real player and at least one virtual player who is not a real player and the players play the game against each other; and a responding image data storage means for storing image data to be displayed selectively on said display part as an image of the virtual player on a predetermined occasion of the game being played on the gaming machine, the image data comprising a plurality of response image data of each virtual player;

wherein said game control means has the virtual player participate in the game being played on the gaming machine so that the response image data stored in said image data storage means is displayed on said display part at a predetermined timing depending on a state of the game being played on the gaming machine;

wherein said game control means (i) determines a quality of play of the game by each of the at least one real player and (ii) selects the stored image data to be displayed such that the displayed image of the virtual player represents a play tactic of that virtual player corresponding to the determined quality for play of the at least one real player;

wherein the quality of play of the game by each of the at least one real player is determined based on (i) past play history of that real player, including one or more of number of times betting, betted quality, average betting time, and number of wins, and (ii) personality of that real player, including one or more of carefulness, degree as a gambler, decisiveness and gaming strength.

6. The gaming machine according to claim 5, wherein the predetermined timing comprises a timing at which a change is about to occur, a change is occurring, or a change has occurred in the game state with at least one player among the plurality of players playing the game with the gaming machine.

7. The gaming machine according to claim 6, wherein each virtual player is set to have each predetermined personality such that a first virtual player shows a first response image corresponding to a first expression, which differs from a second expression corresponding to a second response image by a second virtual player on at least one state of the game or a change of the state of the game.

8. The gaming machine according to claim 5, wherein each virtual player is set to have each predetermined personality such that a first virtual player shows a first response image corresponding to a first expression, which differs from a second expression corresponding to a second response image by a second virtual player on at least one state of the game or a change of the state of the game.

9. A server controlling gaming machines via a communication line, wherein each gaming machine comprises a display part for displaying a state of a game, a game control means for controlling the state of the game in accordance with information input by a real player, and an image taking means for taking an image of the real player, and wherein a plurality of players including at least one virtual player who is not a real player play the game again each other, the server comprising:

an image data storage means for storing image data to be displayed on said display part as an image of the virtual player or the real player;

a response image data storage means for storing response image data of each virtual player in relation to the state of the game, the image data being displayed as an image on said display part at a predetermined state of the game played with the gaming machine;

a detection means for detecting player insufficiency in playing the game with the gaming machine; and a virtual player selection means for selecting the virtual player according to a detection result by said detection means;

wherein said game control means have the virtual player participate in the game being played with the gaming machine, said virtual player being selected by said virtual player selection means according to the detection result by said detection means;

wherein said game control means cause said display part to show at least one of an image of the real player being taken at a predetermined timing by said image taking means, and the response image data being stored by said response image data storage means according to the state of the game being played with the gaming machine;

wherein said game control means (i) determine a quality of play of the game by each of the at least one real player and (ii) select the stored response image data to be displayed such that the displayed image of the virtual player represents a play tactic of that virtual player corresponding to the determined quality for play of the at least one real player;

wherein the quality of play of the game by each of the at least one real player is determined based on (i) past play history of that real player, including one or more of number of times betting, betted quality, average betting time, and number of wins, and (ii) personality of that real player, including one or more of carefulness, degree as a gambler, decisiveness and gaming strength.

10. A computer program recorded on a computer readable medium for execution by a gaming machine comprising a display part for displaying a state of a game, a game control means for controlling the state of the game in accordance with information input by a real player, and an image taking means for taking an image of the real player, an image data storage means for storing a plurality of image data to be displayed on said display part as an image of a virtual player or the real player, and a response image data storage means for storing response image data of each virtual player in relation to the state of the game, the image data being displayed as an image on said display part at a predetermined state of the game played with the gaming machine, wherein a plurality of players, including at least one virtual player who is not a real player, play the game against each other, the execution of the program resulting in the game machine:

detecting player insufficiency in playing the game with the gaming machine;

causing a virtual player to participate in the game being played with the gaming machine, the virtual player being selected according to a detection result by said detection means;

displaying on said display part at least one of an image of the real player being taken at a predetermined timing by said image taking means and the response image data being stored by said response image data storage means according to the state of the game being played with the gaming machine;

determining a quality of play of the game by each of the at least one real player; and selecting the stored response image data to be displayed such that the displayed image of the virtual player represents a play tactic of that virtual player corresponding to the determined quality for play of the at least one real player;

wherein the quality of play of the game by each of the at least one real player is determined based on (i) past play history of that real player, including one or more of number of times betting, betted quality, average betting time, and number of wins, and (ii) personality of that player, including one or more of carefulness, degree as a gambler, decisiveness and gaming strength.

11. A gaming machine including a display part for displaying a state of a game, and game control means for controlling the state of the game in accordance with information input by a plurality of players playing the game against each other, wherein the plurality of players include at least one real player and at least one virtual player who is not a real player, the gaming machine comprising:

a responding image data storage means for storing image data to be displayed selectively on said display part as an image of a virtual player on a predetermined occasion of the name being played on the gaming machine, the image data including a plurality of response image data of each virtual player;

wherein said game control means have the virtual player participate in the game being played on the gaming machine so that the response image data stored in said image data storage means is displayed on said display part at a predetermined timing depending on a state of the game being played on the gaming machine, and said game control means select the response image data based on game condition data for each real player, the game condition data represents a quality of player of the game by each of the at least one real player;

wherein said game control means select the response image data such that the displayed image of the virtual player represents a play tactic of that virtual player corresponding to the quality for play of the at least one real player; and wherein the quality of play of the game by each of the at least one real player corresponds to (i) past play history of that real player, including one or more of number of times betting, betted quality, average betting time, and number of wins, and (ii) personality of that real player, including one or more of carefulness, degree as a gambler, decisiveness and gaming strength.

* * * * *